(12) United States Patent
Ritchie et al.

(10) Patent No.: US 10,886,567 B1
(45) Date of Patent: Jan. 5, 2021

(54) LIQUID ELECTROLYTE FOR A LITHIUM METAL BATTERY

(71) Applicant: Apple Inc., Cupertino, CA (US)

(72) Inventors: Alan A. Ritchie, Menlo Park, CA (US); Paul M. Bayley, Santa Clara, CA (US); Karl M. Brown, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 286 days.

(21) Appl. No.: 16/144,947

(22) Filed: Sep. 27, 2018

Related U.S. Application Data

(60) Provisional application No. 62/564,795, filed on Sep. 28, 2017.

(51) Int. Cl.
| | |
|---|---|
| *H01M 10/0567* | (2010.01) |
| *H01M 10/052* | (2010.01) |
| *H01M 4/38* | (2006.01) |
| *H01M 10/0569* | (2010.01) |
| *H01M 10/0568* | (2010.01) |
| *H01M 4/485* | (2010.01) |

(52) U.S. Cl.
CPC ....... *H01M 10/0567* (2013.01); *H01M 4/382* (2013.01); *H01M 4/485* (2013.01); *H01M 10/052* (2013.01); *H01M 10/0568* (2013.01); *H01M 10/0569* (2013.01); *H01M 2300/0025* (2013.01); *H01M 2300/0091* (2013.01)

(58) Field of Classification Search
CPC .......... H01M 10/052; H01M 10/0567; H01M 10/0568; H01M 10/0569
USPC ....................................................... 429/338
See application file for complete search history.

(56) References Cited

U.S. PATENT DOCUMENTS

| | | | |
|---|---|---|---|
| 8,956,768 B2 | 2/2015 | Iwaya | |
| 9,472,831 B2 | 10/2016 | Roschenthaler et al. | |
| 2014/0023940 A1* | 1/2014 | Zaghib .................. | H01M 4/405 429/405 |
| 2016/0164137 A1* | 6/2016 | Moganty .......... | H01M 10/0565 429/306 |
| 2016/0294005 A1 | 10/2016 | Lee et al. | |
| 2016/0336625 A1 | 11/2016 | Jeong et al. | |
| 2017/0062829 A1 | 3/2017 | Ryu et al. | |

* cited by examiner

*Primary Examiner* — James M Erwin
(74) *Attorney, Agent, or Firm* — Young Basile Hanlon & MacFarlane, P.C.

(57) ABSTRACT

A liquid electrolyte for a lithium metal battery comprises 45-65 mol % of an aprotic solvent, 5-15 mol % of an ionic liquid, 28-44 mol % of a lithium salt and up to 5 mol % additives. The aprotic solvent consists of one or more of a linear carbonate and a linear ether and the ionic liquid consists of one or more of $PYR_{13}FSI$, $PYR_{14}FSI$, $PYR_{13}TFSI$, and $PYR_{14}TFSI$. The lithium salt is selected from the group consisting of LiFSI, LiTFSI, and LiBET. The liquid electrolyte can have a flash point of greater than 60° C. and a dynamic viscosity of less than 120 mPa·s.

17 Claims, 6 Drawing Sheets

LIQUID ELECTROLYTE FOR A LITHIUM METAL BATTERY

CROSS-REFERENCE TO RELATED APPLICATIONS

This application claims the benefit of U.S. Provisional Application No. 62/564,795, filed on Sep. 28, 2017, the content of which is hereby incorporated by reference in its entirety for all purposes.

TECHNICAL FIELD

This application generally relates to an ionic liquid-based electrolyte for lithium metal batteries.

BACKGROUND

Conventional liquid electrolyte for use in a lithium metal battery has lithium salts dissolved in an ionic liquid or an organic solvent. However, organic solvent-based electrolytes have low flash points and can be flammable at temperatures at which a lithium metal battery may operate. Ionic liquid-based electrolytes have high viscosities and can fall short on performance due to limited transport properties of the ionic liquid.

SUMMARY

The disclosed embodiments provide a liquid electrolyte for a lithium metal battery comprising 45-65 mol % of an aprotic solvent, 5-15 mol % of an ionic liquid, 28-44 mol % of a lithium salt and up to 5 mol % additives.

In some embodiments, the aprotic solvent is a linear carbonate, a cyclic carbonate, or a linear ether selected from the group consisting of monoglyme, diglyme, triglyme and tetraglyme.

In some embodiments, the aprotic solvent is dimethyoxyethane (DME) or dimethyl carbonate (DMC).

In some embodiments, the ionic liquid is N-propyl-N-methylpyrrolidinium bis(fluorosulfonyl)imide ($PYR_{13}FSI$), N-butyl-N-methylpyrrolidinium bis(fluorosulfonyl)imide ($PYR_{14}FSI$); N-propyl-N-methylpyrrolidinium bis(trifluoro-methanesulfonyl)imide ($PYR_{13}TFSI$); or N-butyl-N-methylpyrrolidinium bis(trifluoro-methanesulfonyl)imide ($PYR_{14}TFSI$).

In some embodiments, the lithium salt is lithium bis(fluorosulfonyl)imide (LiFSI), lithium bis(trifluoromethanesulfonyl)imide (LiTFSI), and lithium bis(pentafluoroethanesulfonyl)imide (LiBETI).

In some embodiments, the liquid electrolyte has a dynamic viscosity at 30° C. of between 30 mPa·s and 120 mPa·s.

In some embodiments, the liquid electrolyte has a flash point greater than 60° C.

In some embodiments, the aprotic solvent is 50-60 mol % DME, the ionic liquid is 8-12 mol % $PYR_{13}FSI$, and the lithium salt is 32-40 mol % LiFSI.

In some embodiments, the aprotic solvent is 50-60 mol % DMC, the ionic liquid is 8-12 mol % $PYR_{13}FSI$, and the lithium salt is 32-40 mol % of LiFSI.

In some embodiments, the liquid electrolyte has a flash point of greater than 70° C. and a dynamic viscosity of less than 60 mPa·s.

Also disclosed is a liquid electrolyte for a lithium metal battery comprising 50-60 mol % of DMC or DME, 8-12 mol % of an ionic liquid consisting of one or more of $PYR_{13}FSI$, $PYR_{14}FSI$, $PYR_{13}TFSI$, and $PYR_{14}TFSI$, 32-40 mol % of one or more lithium salt selected from the group consisting of LiFSI, LiTFSI, and LiBETI and up to 5 mol % additives, wherein the liquid electrolyte has a flash point of greater than 60° C. and a dynamic viscosity of less than 120 mPa·s.

Also disclosed is a lithium metal battery having a cathode, an anode and the liquid electrolytes disclosed herein.

DETAILED DESCRIPTION

Figure 1:
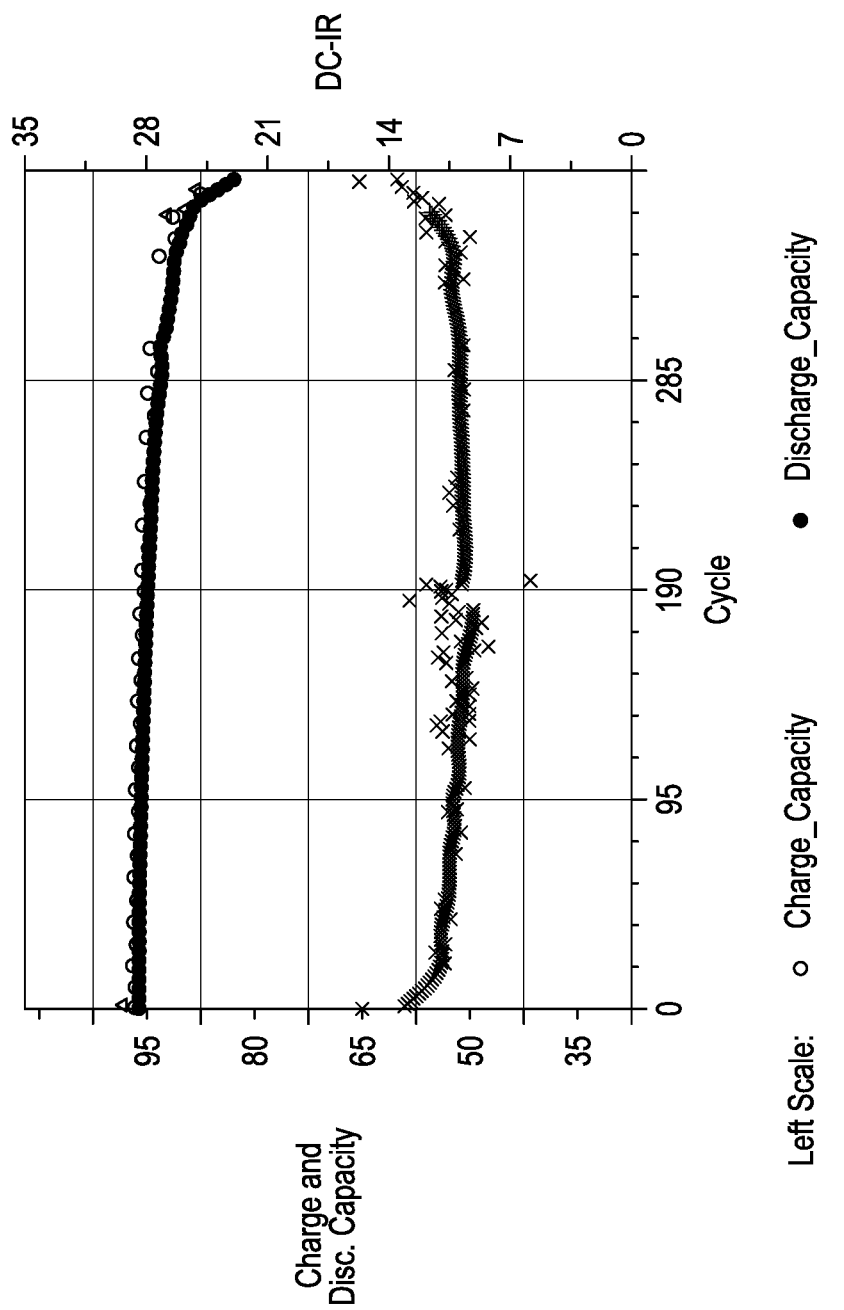
FIG. 1 is a graph showing charge capacity, discharge capacity and DC-IR for a cell incorporating the liquid electrolyte as disclosed herein.

Liquid electrolytes for lithium metal batteries should be chemically compatible with metallic lithium, allow for cell reversibility utilizing a suitable cathode and be non-flammable. Ionic liquids and organic solvents are options for liquid electrolytes in lithium metal batteries that each have their disadvantages.

Although typically non-flammable and chemically compatible with lithium metal, ionic liquids provide limited transport properties, resulting in poor cell reversibility. Cell reversibility can be improved with an increased amount of lithium salt. However, as the lithium salt content increases, the liquid viscosity increases while the cell wetting decreases. The viscosity of ionic liquids can increase 4-10 times after the required salt is added for acceptable electrochemical performance. As examples, the dynamic viscosity at 30° C. of (1) N-propyl-N-methylpyrrolidinium bis(fluorosulfonyl)imide ($PYR_{13}$ FSI) with no lithium salt added is 48 mPa·s, (2) $PYR_{13}$ FSI with 36 mol % lithium bis(fluorosulfonyl)imide (LiFSI) is 120 mPa·s, and (3) $PYR_{13}$ FSI with 50 mol % LiFSI salt is 451 mPa·s. The amount of LiFSI salt that can be solvated into $PYR_{13}FSI$ is limited to 50.5 mol %.

Organic solvent electrolytes can be chemically compatible with lithium metal and provide acceptable electrochemical reversibility but have low flash points. As an example, dimethyoxyethane (DME) has a flash point of −2° C. and dimethyl carbonate (DMC) has a flash point of 17° C. The flash points of organic solvents improve when lithium salt is added, but still do not reach non-flammable ratings. As examples, DME with 10 mol % LiFSI has a flash point of less than 25° C. and DME with 40 mol % LiFSI has a flash point of less than 40° C. Standards for non-flammability vary. The U.S. defines non-flammability as having a flash point of greater than 38° C. The UN defines a stricter standard for non-flammability, a flash point of greater than 60° C., with a further limit of a flash point of great than 93° C. for a non-combustible rating.

A benefit provided by organic solvents is their low viscosity, even at high salt concentrations. As examples, the dynamic viscosity at 30° C. of dimethyoxyethane (DME) with 10 mol % LiFSI salt is 1.4 mPa·s and with 40 mol % LiFSI is 30 mPa·sn Disclosed herein are liquid electrolytes for lithium metal batteries that are not flammable, have an acceptable viscosity and have a high salt content. The liquid electrolytes can consist of an aprotic solvent, an ionic liquid and a lithium salt, with the aprotic solvent being between 45 mol % and 65 mol % of the liquid electrolyte, the ionic liquid being between 5 mol % and 15 mol % of the liquid electrolyte and the lithium salt being between 28 mol % and 44 mol % of the liquid electrolyte. The liquid electrolyte may have up to 5 mol % additives. All ranges used herein are inclusive. Although some aprotic solvents have a flash point below 0° C., the electrolytes disclosed herein are non-flammable and even non-combustible. Electrolyte rate capability at C/2 discharge is not maintained when the amount of lithium salt is 46 mol % or greater, while the cell experiences a significant reduction in cycle life when the amount of lithium salt falls 26 mol % or below. The lithium ion is solvated to form a complex such that the aprotic solvent is bound in the mixture, resulting in high flash points even when aprotic solvents with low flash points are used. The cell reversibility is significantly improved with these electrolytes due to the ability of the mixture to solvate unusually high salt contents, even using ionic liquids with high viscosities. Stability of the cell is improved due to the ionic liquid improving stability of the electrolyte against the lithium metal anode.

The aprotic solvent can be one or more of a linear carbonate, a cyclic carbonate, or a linear ether selected from the group consisting of monoglyme, diglyme, triglyme and tetraglyme. As non-limiting examples, DME, ethyl methyl carbonate (EMC), DMC, and diethyl carbonate (DEC) are suitable aprotic organic solvents.

The ionic liquid can be one or more of N-ethyl-N-methylpyrrolidinium bis(fluorosulfonyl)imide ($PYR_{12}FSI$), N-propyl-N-methylpyrrolidinium bis(fluorosulfonyl)imide ($PYR_{14}FSI$), N-butyl-N-methylpyrrolidinium bis(fluorosulfonyl)imide ($PYR_{14}FSI$); N-propyl-N-methylpyrrolidinium bis(trifluoro-methanesulfonyl)imide ($PYR_{13}TFSI$); or N-butyl-N-methylpyrrolidinium bis(trifluoro-methanesulfonyl)imide ($PYR_{14}TFSI$), as non-limiting examples.

The lithium salt should not be sensitive to moisture so that it does not break down. The lithium salt should have weakly coordinating anions and be hydrolytically stable. Non-limiting examples of the lithium salt is lithium bis(fluorosulfonyl)imide (LiFSI), lithium bis(trifluoromethanesulfonyl)imide (LiTFSI), and lithium bis(pentafluoroethanesulfonyl)imide (LiBETI). One or a combination of lithium salts can be used.

Another liquid electrolyte disclosed herein consists of 50-60 mol % of DMC or DME, 8-12 mol % of an ionic liquid consisting of one or more of $PYR_{13}FSI$, $PYR_{14}FSI$, $PYR_{13}TFSI$, and $PYR_{14}TFSI$, 32-40 mol % of one or more lithium salt selected from the group consisting of LiFSI, LiTFSI, and LiBETI and up to 5 mol % additives.

The liquid electrolytes disclosed herein have a dynamic viscosity at 30° C. of between 30 mPa·s and 120 mPa·s, are non-flammable and provide excellent cell reversibility.

Examples

Figure 2:
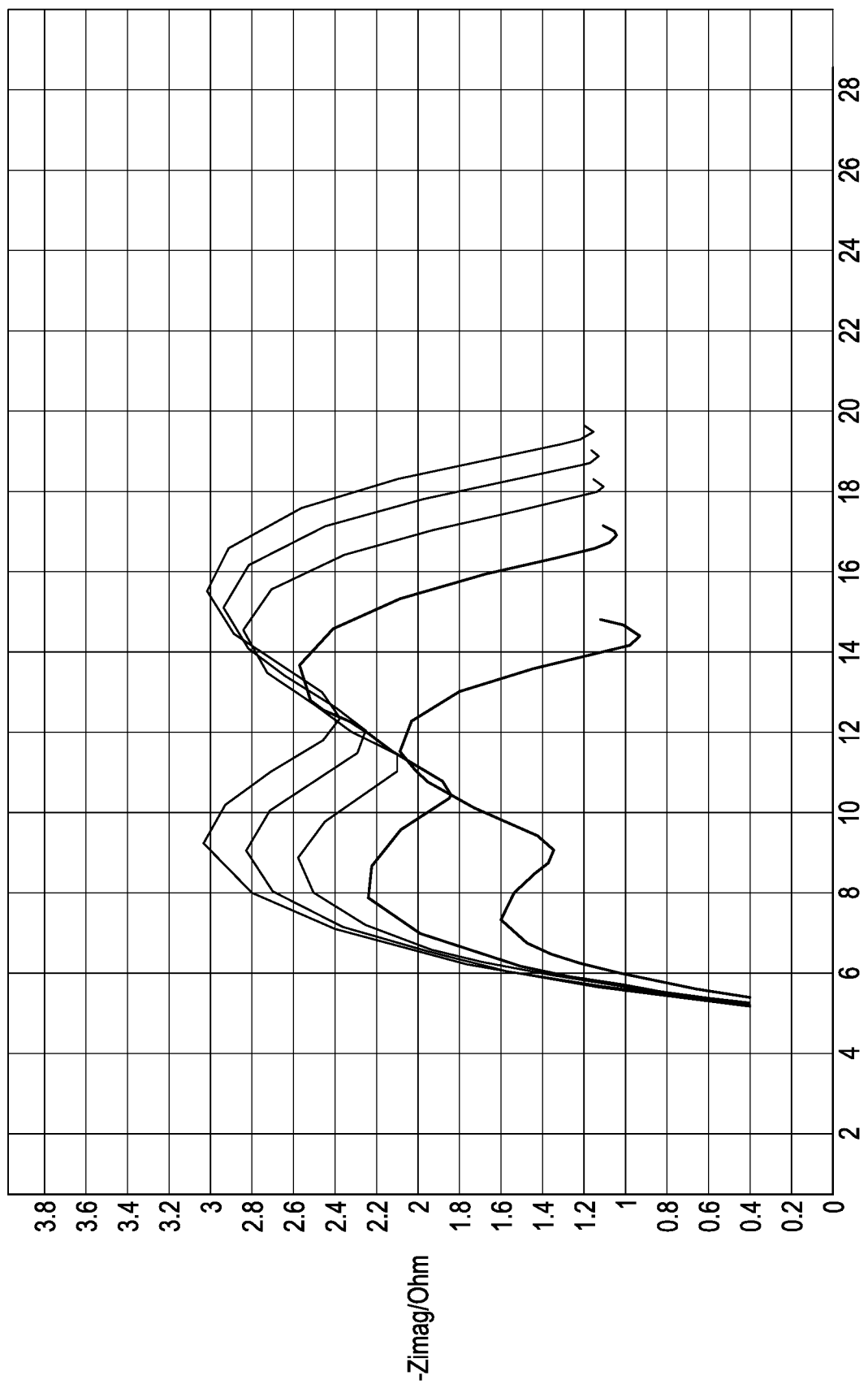
FIG. 2 is a graph showing cell stability using a high voltage hold and an electrolyte consisting of an ionic liquid and lithium salt.
Figure 3:
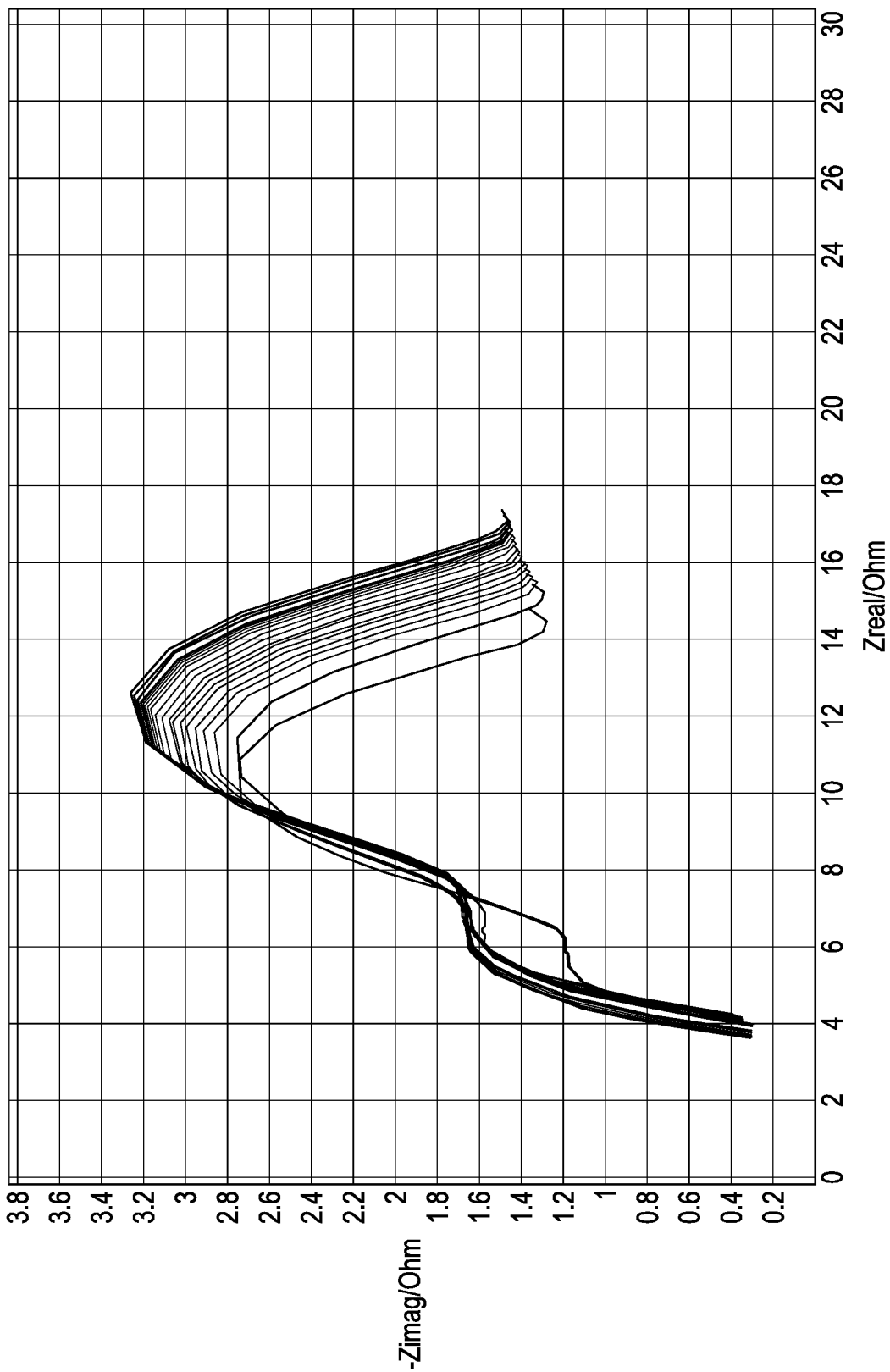
FIG. 3 is a graph showing cell stability using a high voltage hold and an electrolyte consisting of an aprotic solvent and lithium salt.
Figure 4:
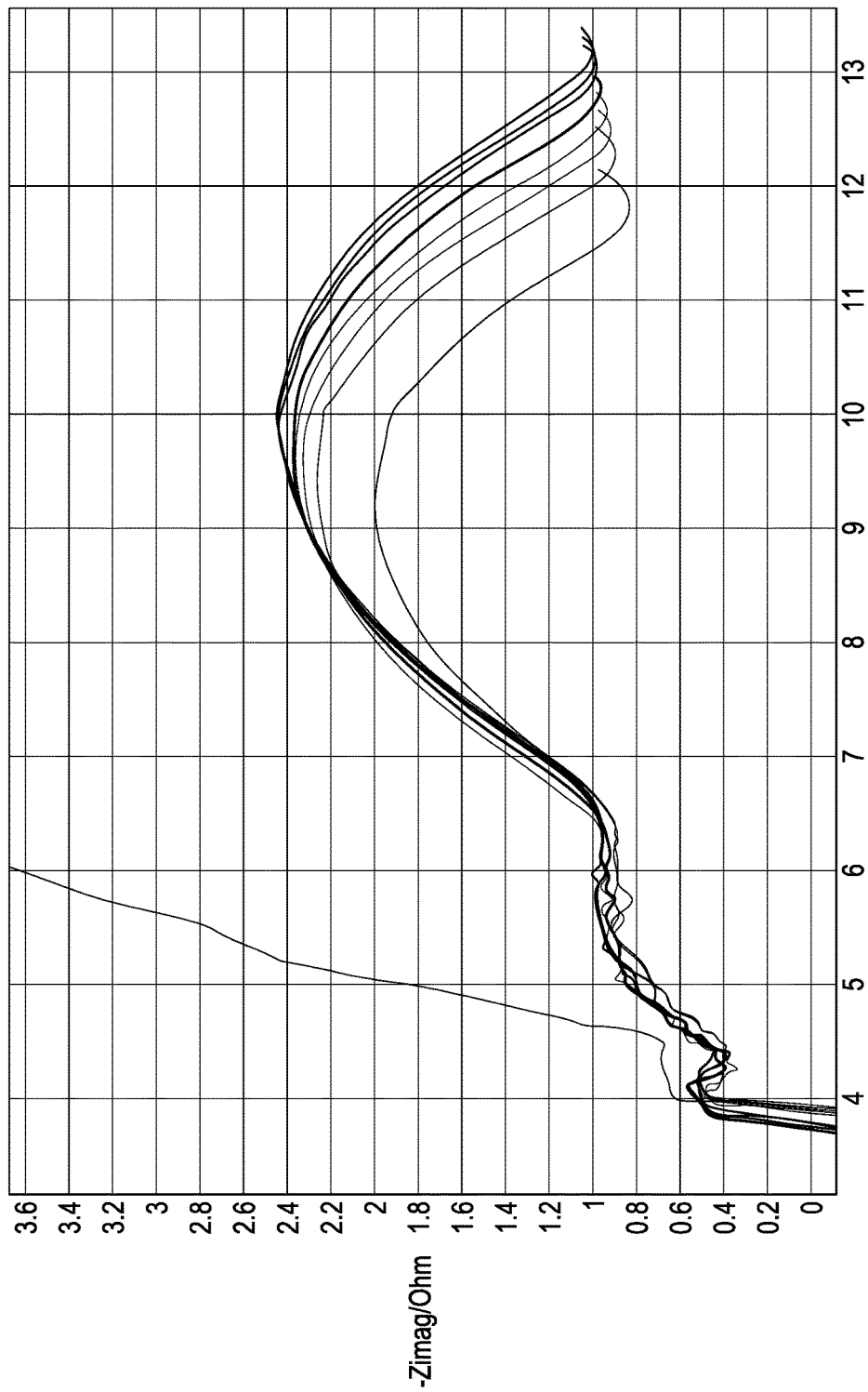
FIG. 4 is a graph showing cell stability using a high voltage hold and an electrolyte as disclosed herein consisting of an ionic liquid, aprotic solvent and lithium salt.

A liquid electrolyte was made using 54 mol % DMC, 36 mol % LiFSI and 10 mol % $PYR_{13}FSI$. The electrolyte was tested in a cell comprising a cathode, an anode formed of a Cu foil with 20 μm evaporated lithium and a polyethylene separator. The cell was cycled at typical charge and discharge rates with >95% of the theoretical capacity being turned over. As seen in FIG. 1, DCIR remained relatively flat during the testing and after a few hundred cycles, the cell retains >90% capacity. FIGS. 2-4 compare the stability of electrolytes in an anode and cathode system using a high voltage hold (4.4V). FIGS. 2-4 illustrate the cell impedance evolution over time where the least amount of evolution is desirable. FIG. 2 illustrates the stability of the cell using ionic liquid $PYR_{14}FSI$ with LiFSI salt and FIG. 3 illustrates the stability of the cell using solvent DMC with 60 mol % LiFSI. Each shows an undesirable impedance growth on anode and cathode electrodes. FIG. 4 illustrates the stability of the cell using a combination of 10 mol % $PYR_{13}FSI$, 54 mol % DMC and 36 mol % LiFSI. The combination produced the least impedance growth.

Figure 5:
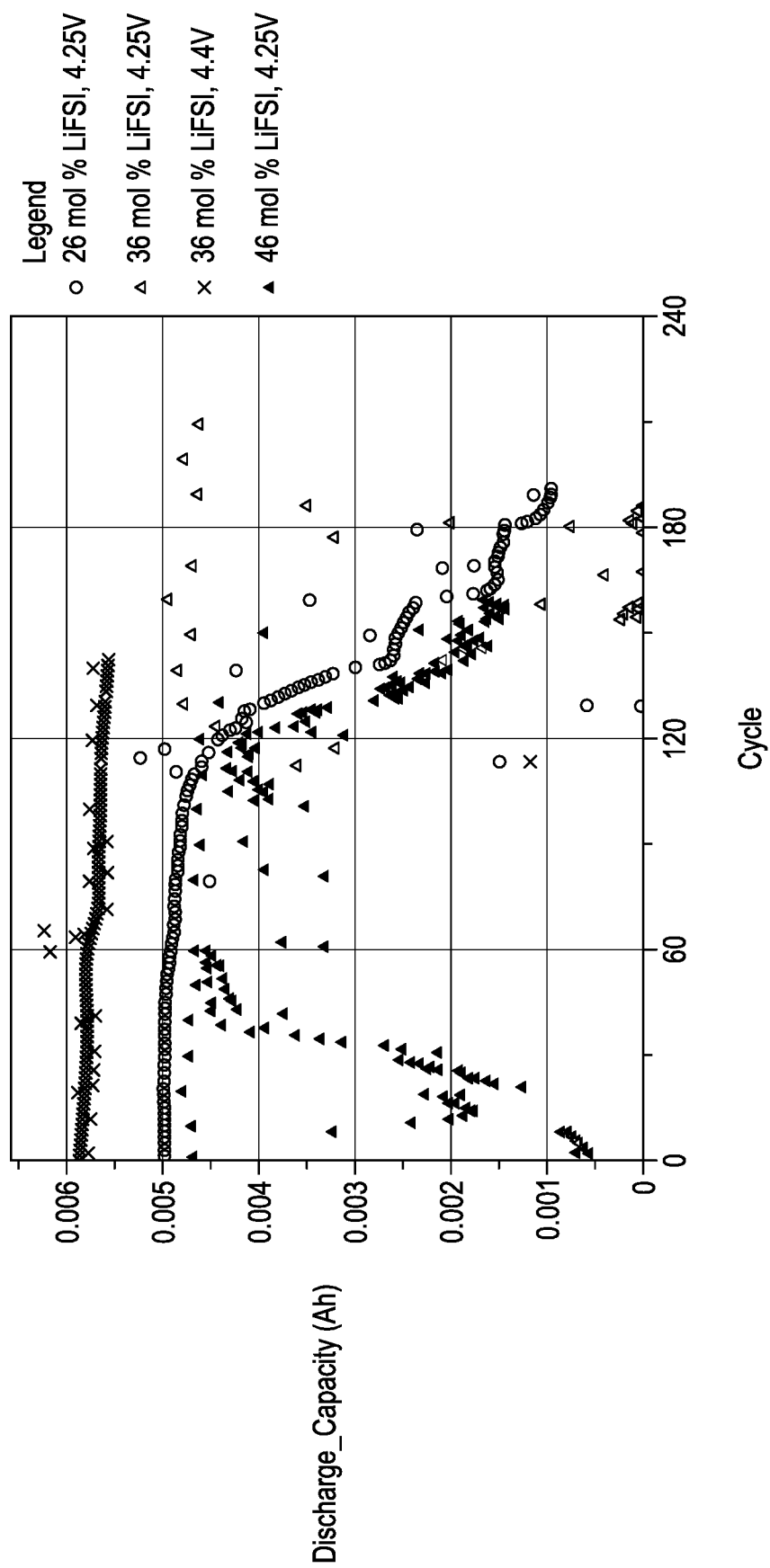
FIG. 5 is a graph illustrating cycle life for cells using electrolytes having both aprotic solvent and ionic liquid, with one of 26 mol % lithium salt, 36 mol % lithium salt or 46 mol % lithium salt.

FIG. 5 illustrate the impact of the amount of lithium salt on the electrolyte performance. FIG. 5 illustrates cycle life for cells with and electrolyte consisting of $PYR_{13}FSI$ and DMC and either 26 mol %, 36 mol % or 46 mol % LiFSI. The results show a significant reduction in cycle life when the salt content is reduced to 26 mol % and both a reduction in cycle life and a loss of rate capability when the salt content is increased to 46 mol %.

Another liquid electrolyte was made using $PYR_{13}FSI$, DME and LiFSI. The liquid electrolyte has 54 mol % DME and 36 mol % LiFSI, with the remainder being $PYR_{13}FSI$. The liquid electrolyte has a dynamic viscosity of 55 mPa·s and a flash point of 78° C., meeting both U.S. and UN non-flammability standards.

To test flash points, a metered sample of 1 ml was dispensed into a sample cup, which is then heated and stirred at a controlled rate in the sealed ignition chamber, per ASTM D6540 standard, with flash point defined as a greater than 20 kPa delta pressure between ignition steps. The U.S. defines flammable liquids as liquids with a flash point of less than 38° C. while the UN defines flammable liquids as liquids with a flash point of less than 60° C.

Figure 6:
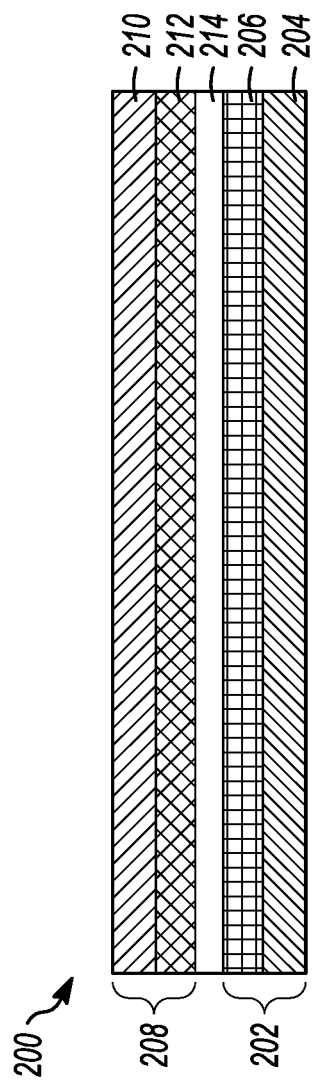
FIG. 6 is a cross-section view of a lithium metal battery as disclosed herein

An aspect of the disclosed embodiments is a lithium metal battery 200, the layers of which are shown in cross-section in FIG. 6. The lithium metal battery 200 has an anode 202 with an anode current collector 204 and an anode active material 206 disposed on the anode current collector 204. The lithium metal battery 200 also has a cathode 208 with a cathode current collector 210 and a cathode active material 212 disposed over the cathode current collector 210. The cathode 208 and the anode 202 are separated by a separator 214 and the liquid electrolyte disclosed herein.

The cathode current collector 210 can be, for example, an aluminum sheet or foil. Cathode active materials 212 can include one or more lithium transition metal oxides which can be bonded together using binders and optionally conductive fillers such as carbon black. Lithium transition metal oxides can include, but are not limited to, $LiCoO_2$, $LiNiO_2$, $LiNi_{0.8}Co_{0.15}Al_{0.05}O_2$, $LiMnO_2$, $Li(Ni_{0.5}Mn_{0.5})O_2$, $LiNi_xCo_yMn_zO_2$, Spinel $Li_2Mn_2O_4$, $LiFePO_4$ and other polyanion compounds, and other olivine structures including $LiMnPO_4$, $LiCoPO_4$, $LiNi_{0.5}Co_{0.5}PO_4$, and $LiMn_{0.33}Fe_{0.33}Co_{0.33}PO_4$. As needed, the cathode active material 212 can contain an electroconductive material, a binder, etc.

The anode active material 206 can comprise at least one selected from the group consisting of a metal material, an alloy material and a carbonaceous material. The anode active material 206 is not particularly limited, and can comprise lithium metals, lithium alloys, lithium-containing metal oxides, lithium-containing metal sulfides, lithium-containing metal nitrides, carbonaceous materials such as graphite, etc. The anode current collector 204 can be a copper or nickel sheet or foil, as a non-limiting example.

The separator 214 may be a single layer or multi-layer of polyethylene, polypropylene, and polyvinylidene fluoride, as non-limiting examples.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art.

What is claimed is:

1. A liquid electrolyte for a lithium metal battery, comprising:
   45-65 mol % of an aprotic solvent;
   5-15 mol % of an ionic liquid;
   28-44 mol % of a lithium salt; and
   up to 5 mol % additives.

2. The liquid electrolyte of claim 1, wherein the aprotic solvent is a linear carbonate, a cyclic carbonate, or a linear ether selected from the group consisting of monoglyme, diglyme, triglyme and tetraglyme.

3. The liquid electrolyte of claim 1, wherein the aprotic solvent is dimethyoxyethane (DME) or dimethyl carbonate (DMC).

4. The liquid electrolyte of claim 1, wherein the ionic liquid is N-propyl-N-methylpyrrolidinium bis(fluorosulfonyl)imide ($PYR_{13}FSI$), N-butyl-N-methylpyrrolidinium bis(fluorosulfonyl)imide ($PYR_{14}FSI$); N-propyl-N-methylpyrrolidinium bis(trifluoro-methanesulfonyl)imide ($PYR_{13}TFSI$); or N-butyl-N-methylpyrrolidinium bis(trifluoro-methanesulfonyl)imide ($PYR_{14}TFSI$).

5. The liquid electrolyte of claim 1, having a dynamic viscosity at 30° C. of between 30 mPa·s and 120 mPa·s.

6. The liquid electrolyte of claim 1, wherein the lithium salt is lithium bis(fluorosulfonyl)imide (LiFSI), lithium bis(trifluoromethanesulfonyl)imide (LiTFSI), and lithium bis(pentafluoroethanesulfonyl)imide (LiBETI).

7. The liquid electrolyte of claim 1, having a flash point greater than 60° C.

8. The liquid electrolyte of claim 1, wherein the aprotic solvent is 50-60 mol % DME, the ionic liquid is 8-12 mol % $PYR_{13}FSI$, and the lithium salt is 32-40 mol % LiFSI.

9. The liquid electrolyte of claim 1, wherein the aprotic solvent is 50-60 mol % DMC, the ionic liquid is 8-12 mol % $PYR_{14}FSI$, and the lithium salt is 32-40 mol % of LiFSI.

10. A liquid electrolyte for a lithium metal battery, comprising:
    50-60 mol % of DMC or DME;
    8-12 mol % of an ionic liquid consisting of one or more of $PYR_{13}FSI$, $PYR_{14}FSI$, $PYR_{13}TFSI$, and $PYR_{14}TFSI$;
    32-40 mol % of one or more lithium salt selected from the group consisting of LiFSI, LiTFSI, and LiBETI; and
    up to 5 mol % additives, wherein the liquid electrolyte has a flash point of greater than 60° C. and a dynamic viscosity of less than 120 mPa·s.

11. The liquid electrolyte of claim 10, comprising 52-56 mol % of DMC and 34-38 mol % of LiFSI.

12. A lithium metal battery, comprising:
    a cathode having a cathode current collector and a cathode active material comprising a lithium transition metal oxide;
    an anode having an anode current collector and an anode active material comprising lithium metal; and
    a liquid electrolyte comprising:
      45-65 mol % of an aprotic solvent;
      5-15 mol % of an ionic liquid;
      28-44 mol % of a lithium salt; and
      up to 5 mol % additives.

13. The lithium metal battery of claim 12, wherein the aprotic solvent is a linear carbonate, a cyclic carbonate, or a linear ether selected from the group consisting of monoglyme, diglyme, triglyme and tetraglyme.

14. The lithium metal battery of claim 12, wherein the ionic liquid is N-propyl-N-methylpyrrolidinium bis(fluorosulfonyl)imide ($PYR_{13}FSI$), N-butyl-N-methylpyrrolidinium bis(fluorosulfonyl)imide ($PYR_{14}FSI$); N-propyl-N-methylpyrrolidinium bis(trifluoro-methanesulfonyl)imide ($PYR_{13}TFSI$); or N-butyl-N-methylpyrrolidinium bis(trifluoro-methanesulfonyl)imide ($PYR_{14}TFSI$).

15. The lithium metal battery of claim 12, wherein the lithium salt is lithium bis(fluorosulfonyl)imide (LiFSI), lithium bis(trifluoromethanesulfonyl)imide (LiTFSI), and lithium bis(pentafluoroethanesulfonyl)imide (LiBETI).

16. The lithium metal battery of claim 12, wherein the aprotic solvent is 50-60 mol % DMC, the ionic liquid is 8-12 mol % $PYR_{13}FSI$, and the lithium salt is 32-40 mol % of LiFSI.

17. The lithium metal battery of claim 16, having a flash point greater than 70° C.

* * * * *

UNITED STATES PATENT AND TRADEMARK OFFICE
CERTIFICATE OF CORRECTION

PATENT NO.           : 10,886,567 B1
APPLICATION NO.      : 16/144947
DATED                : January 5, 2021
INVENTOR(S)          : Alan A. Ritchie, Paul M. Bayley and Karl M. Brown It is certified that error appears in the above-identified patent and that said Letters Patent is hereby corrected as shown below:

In the Claims

At Column 5, Claim number 9, Line number 49, "$PYR_{14}FSI$" should be --$PYR_{13}FSI$--.

Signed and Sealed this
Second Day of March, 2021

Drew Hirshfeld
*Performing the Functions and Duties of the
Under Secretary of Commerce for Intellectual Property and
Director of the United States Patent and Trademark Office*